H. & A. HERSH.
Cornstalk Mill.
No. 19,561.
Patented March 9, 1858.
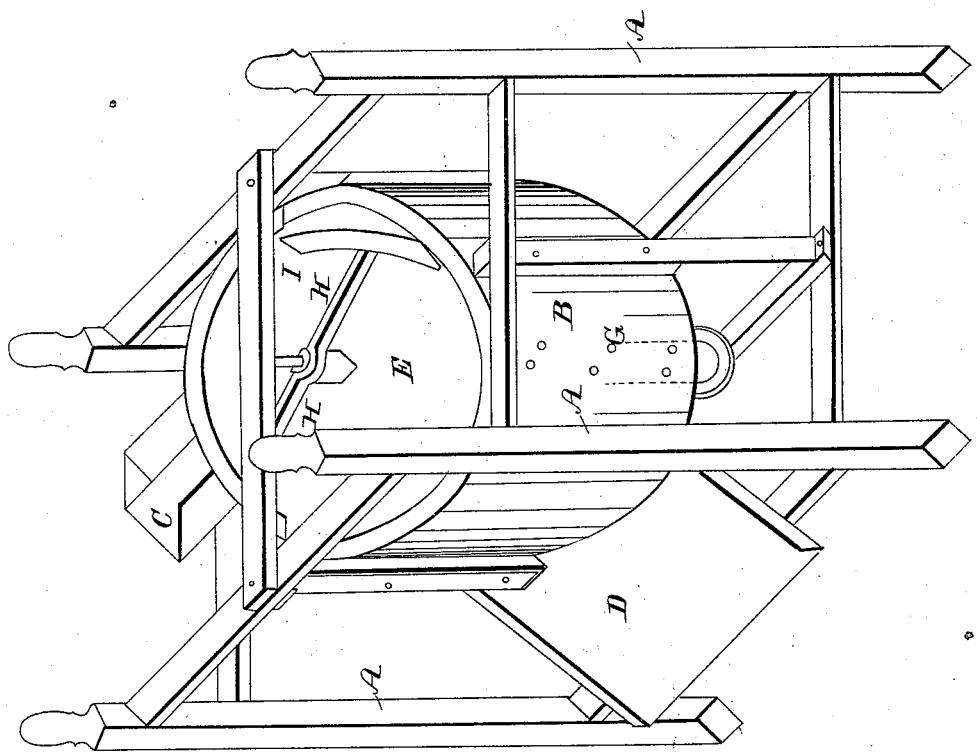
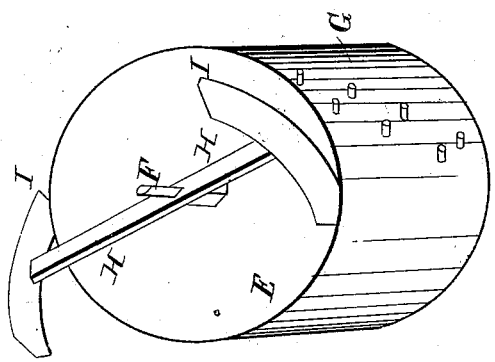

UNITED STATES PATENT OFFICE.

HENRY HERSH AND AMOS HERSH, OF LANCASTER COUNTY, PENNSYLVANIA.

IMPROVEMENT IN MACHINES FOR CUTTING AND CRUSHING CORNSTALKS.

Specification forming part of Letters Patent No. 19,561, dated March 9, 1858.

*To all whom it may concern:*

Be it known that we, HENRY HERSH and AMOS HERSH, of Lancaster county, State of Pennsylvania, have invented new and useful Improvements in the Machine for Cutting and Crushing Cornstalks; and we do hereby declare that the following is a full and exact description thereof, reference being had to the accompanying drawing, and to the letters of reference marked thereon, making a part of this specification.

The nature of our invention is curved and angular shaped knives located at top of cylinder with spirally-set teeth.

To enable others skilled in the art to make and use our invention, we will proceed to describe its construction and operation.

A is the square upright frame.

B is the vertical outside stationary cylinder with opening C, into which the cornstalks are inserted, and opening D, out of which the crushed pieces are discharged from the cylinder. This cylinder has four double rows of teeth permanently attached on its inner side, between which the teeth on the periphery of the inner cylinder E pass and crush the cuttings.

E is the inner cylinder operating on a vertical shaft F to be driven by horse-power. On the outside of this cylinder E are four rows of teeth G, set in spiral or screw form, which by the revolution of the cylinder E act upon and crush the cuttings between the teeth on the concave B as they fall from the knives I above.

H H are two arms extending in a right line across the top of cylinder E and attached to shaft F. At the extremities of these arms are two curved blades or knives I, curved to correspond with the circumference of the cylinder E, and they project upward at an angle of forty-five degrees from the edge of the cylinder E, forming spiral-shaped cutters with sharp edges in front and square points at top and bottom to correspond with the shape of the cylinder E. As soon as the cornstalks are inserted into the machine these knives cut the ends off clear. Running in a curve they cut sidewise, and projecting at their sharp angle they cut downward. Consequently the cornstalks are not dragged or torn at the ends and some pieces longer than others; but the knives cutting circular and downward at the same sweep cut the pieces off with astonishing accuracy and evenness and more rapidly than any machine we have yet seen. We are now using this machine, and cannot conceive how it can be excelled in its performance. Its simplicity is such as to cost but a trifle and allows every farmer the opportunity of having a machine convenient in his barn for making feed for cattle in the best and most hasty manner.

What we claim as our invention, and desire to secure by Letters Patent, is—

1. The peculiar shape of the knives located at top of cylinder and attached to the arms of shaft for the purpose of cutting off the ends of cornstalks by a circular sweep and an angular downward cut at the same operation, as herein described.

2. The combination of the knives as curved to correspond with the cylinder at top and its spirally-set teeth at the sides for the purpose of cutting and crushing the cornstalk at one operation most effectually and in the simplest manner, as herein described.

HENRY HERSH.
AMOS HERSH.

Witnesses:
J. FRANKLIN REIGART,
M. CARPENTER.